United States Patent
Oikarinen et al.

(10) Patent No.: US 10,778,715 B2
(45) Date of Patent: Sep. 15, 2020

(54) AUTOMATIC PEER TO PEER LEVEL OF ACTIVITY INFORMATION MAINTENANCE AND SHARING METHOD AND APPARATUS

(71) Applicant: OATH INC., New York, NY (US)

(72) Inventors: Matti Oikarinen, San Jose, CA (US); Mika Mannermaa, San Jose, CA (US); Atte Lahtiranta, Cupertino, CA (US); Taneli Mielikainen, Sunnyvale, CA (US)

(73) Assignee: OATH INC., New York, NY (US)

( * ) Notice: Subject to any disclaimer, the term of this patent is extended or adjusted under 35 U.S.C. 154(b) by 228 days.

(21) Appl. No.: 15/483,320

(22) Filed: Apr. 10, 2017

(65) Prior Publication Data
US 2018/0295150 A1    Oct. 11, 2018

(51) Int. Cl.
*G06F 7/04* (2006.01)
*H04L 29/06* (2006.01)
*H04L 29/08* (2006.01)

(52) U.S. Cl.
CPC ........ *H04L 63/1441* (2013.01); *H04L 63/102* (2013.01); *H04L 63/1425* (2013.01); *H04L 67/104* (2013.01); *H04L 67/42* (2013.01)

(58) Field of Classification Search
CPC ... H04L 63/1441; H04L 67/104; H04L 67/42; H04L 63/102; H04L 63/1425
USPC ..................... 726/23; 707/640; 709/201, 204
See application file for complete search history.

(56) References Cited

U.S. PATENT DOCUMENTS

| 2003/0099240 A1* | 5/2003 | Lee ......................... H04J 3/247 370/395.1 |
| 2004/0199613 A1* | 10/2004 | Hundscheidt ........... H04L 67/32 709/220 |
| 2005/0128958 A1* | 6/2005 | Hamdan ............... H04W 48/08 370/254 |

(Continued)

OTHER PUBLICATIONS

Shapiro et al., "Conflict-free Replicated Data Types," HAL Id: inria-00609399, https://hal.inria.fr/inria-00609399v1; 17 pages (Jul. 19, 2011).

(Continued)

*Primary Examiner* — Gary S Gracia
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatic peer-to-peer level of activity information maintenance and sharing without centralization. The disclosed systems and methods a peer-to-peer level of activity sharing mechanism involving sharing level of activity counter update instructions for use in updating a number of level of activity counters maintained locally by a peer receiving the instruction(s). A peer can use its local level of activity counters in determining whether impose a throttling mechanism.

20 Claims, 8 Drawing Sheets

(56) References Cited

U.S. PATENT DOCUMENTS

| | | | | |
|---|---|---|---|---|
| 2008/0235331 A1* | 9/2008 | Melamed | ............ | H04L 67/104 709/204 |
| 2011/0296252 A1* | 12/2011 | Maenpaa | ............ | H04L 67/104 714/48 |
| 2012/0042000 A1* | 2/2012 | Heins | ............ | G06Q 10/10 709/201 |
| 2014/0012906 A1* | 1/2014 | Teja | ............ | H04L 67/1046 709/204 |
| 2014/0040206 A1* | 2/2014 | Ramakrishnan | .... | G06F 11/2097 707/640 |
| 2014/0188888 A1* | 7/2014 | Harris | ............ | G06F 9/00 707/740 |
| 2014/0219091 A1* | 8/2014 | Hellhake | ............ | H04L 45/32 370/235 |
| 2014/0310530 A1* | 10/2014 | Oguma | ............ | H04L 9/3242 713/181 |

OTHER PUBLICATIONS

Shapiro et al., "A comprehensive study of Convergent and Commutative Replicated Data Types," HAL Id: inria-00555588, https://hal.inria.fr/inria-00555588; 51 pages (Jan. 13, 2011).

\* cited by examiner

AUTOMATIC PEER TO PEER LEVEL OF ACTIVITY INFORMATION MAINTENANCE AND SHARING METHOD AND APPARATUS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to blocking malicious activity, e.g., spamming, denial of service attacks, hackers, etc. using peer-to-peer level of activity information maintenance and sharing.

BACKGROUND

Malicious activity, such as and without limitation spamming, denial of service attacks, hacking, or the like, is of significant concern to online service providers and users. Currently, malicious activity is typically detected based on a level of activity, which is typically monitored using level of activity counters. By way of some non-limiting examples, level of activity counters can be used to monitor user actions, abusive actions, action per network address, or the like, each of which has a ceiling value which when hit results in a block of the activity. Presently, a centralized approach is used to maintain and share level of activity counters. This approach requires that the centralized level of activity counters be maintained in a centralized store (e.g., centralized database server), which receives counter updates from servers and distributes the updated counters to the servers. This approach lacks scalability and introduces latency, particularly when there is a high number of counters and/or a high volume of counter updates. The problems associated with the centralized approach are especially problematic when distributed attacks, e.g., attacks across multiple data centers, need to be addressed and prevented. While partitioning and/or replication may be used with the centralized approach, this approach also suffers from scalability and latency issues, especially when there is a high number of counters and/or a high volume of counter updates.

SUMMARY

The present disclosure provides novel systems and methods for automatic peer-to-peer level of activity information maintenance and sharing without centralization. The approach provides high availability of level of activity information without requiring a complex architecture.

Presently, a centralized approach is used to maintain and disseminate level of activity counters. Using the centralized approach, the level of activity counters are centrally maintained and updated (based on level of activity counters received from a number of servers) and the updated level of activity counters are disseminated to the servers. In one example of a centralized approach, each server caches the level of activity counters locally and synchronizes the cached counters with the centralized store periodically. This approach is prone to latency-based attacks, is complicated and is error-prone (e.g., erroneously blocking out users). The automatic distributed level of activity counters without centralization described herein accommodates a high number of counters and/or a high volume of counter updates, and with desirable results including without limitation low-latency counter distribution (e.g., less than 1 millisecond delay, inclusive of network delay(s)) across servers (e.g., which results in fast prevention of abuse, high availability (e.g., avoids dependencies to external systems and works even in a case of a network partition (or split) caused by a network device failure), high accuracy (including accurate counter decay), scalability to any number of servers (e.g., thousands, tens of thousands, etc. servers), simple operation and implementation, low network overhead (e.g., an increase in scale does not lead to an increase in the server traffic) and low cost (e.g., no additional servers needed and low CPU impact).

According to some embodiments, the disclosed systems and methods first receives, from a client computing device and at server, a request requiring an update to a local level of activity counter. As some non-limiting examples, the server can be configured to provide a service to a number of clients. A number of local level of activity counters can be updated, such that each counter's count (or count value) is updated (e.g., increment, decrement, decay, boost, set (or reset) to a certain value, etc.). The local level of activity counter(s) can be updated in response to a request (or call) by a client, and the updated local level of activity counter(s) correspond to the client making the request (or call). The client can be identified by an identifier (or combination of identifiers), such as and without limitation a user ID, network (e.g., Internet Protocol, or IP) address, cookie identifier, or the like. A message is communicated, by the server, to a number of other servers (or peers) with which the server shares level of activity information, each one of the number of the peers is capable of maintaining its own local level of activity counter(s) corresponding to the client locally. The message comprises a command instructing each one of the number of peers to which the message is directed to update (e.g., increment, decrement, decay, boost, set (reset) to a certain value, etc.) its local level of activity counter(s) corresponding to the client (e.g., as specified by the client key) identified in the message.

The disclosed systems and methods may use the count maintained using the local level of activity counter(s) to determine whether or not to throttle (or limit) operations, or for any other purpose, with respect to any number of clients. The determination may be made using a local level of activity counter's counter value whose update includes applying a decay (or gain). By way of some non-limiting examples, the decay (or gain) may be based on an exponential decay over time or call count, linear decay (gain) over time or call count, explicit reset periodically, sliding window, sigmoid, or the like. A local level of activity counter may have an associated upper limit (or threshold) value, such that if the count value of the local level of activity counter reaches the upper limit it is not incremented further. Rather than incrementing the count value of a local level of activity counter, the count value can be decremented (or incremented) with or without applying a gain (or decay) function to the count value. Such an inverse functionality can be used for token-based throttling, e.g., decrease token count per client. An instruction recipient (e.g., a peer) can further decay and/or boost the received count based on its state.

The disclosed systems and methods may send the message, with an instruction to update the local level of activity counter(s), to all of the peers sharing level of activity information with the server. Alternatively, the message can be sent to a subset of the peers. In the latter case, the message can include an instruction to increment the counter by an amount dependent on the number of peers included in the subset and the total number of peers sharing level of activity information. By way of a non-limiting example, in a case that there are 1000 peers (including the server communicating the message to its peers) sharing level of activity information and the message is to be sent to ten percent (or 100 peers) of the 1000 peers, the message can be communicated to the 100 peers with an instruction to each peer to increment its own local level of activity counter(s) by 10. By way of some non-limiting examples, the peers included in the peer subset may be selected randomly (e.g., any random, random unique set, random continuous range, etc.), round robin, or the like. Peers sharing level of activity information may be pre-defined, automatically discovered (e.g., gossiping), or the like. Communication between peers can be multicasting, broadcasting, or the like.

It will be recognized from the disclosure herein that embodiments of the instant disclosure provide improvements to a number of technology areas, for example those related to network systems, processes, resources and/or services, including without limitation e-commerce, electronic messaging, electronic social networking platform, content (e.g., textual content, audio content, multimedia content, or the like) provisioning platform, cloud-computing and/or storage platform, search engine, web-hosting, recommendation platform, and the like. The disclosed systems and methods can effectuate increased speed and efficiency in the ways that malicious attacks are identified and handled, thereby minimizing an impact of such attacks, as the disclosed systems and methods, inter alia, provide automatic peer-to-peer level of activity information sharing without centralization. Level of activity counters are maintained by each peer locally and level of activity information is shared, by each peer, with other peers as an instruction(s) to each other peer to update its own level of activity counters through the disclosed systems and methods.

In accordance with one or more embodiments, a method is disclosed which includes receiving, at a server computing device of a peer and from a computing device of a client over an electronic communications network, a request of the client for a service; updating, via the server computing device and by the peer, a local level of activity counter corresponding to the client; determining, via the server computing device, a number of other peers of a plurality of peers sharing level of activity information, the plurality of peers comprising the peer and the number of other peers excluding the peer; automatically instructing, via the server computing device, each other peer of the number of other peers to update its local level of activity counter corresponding to the client in connection with the service request, the automatic instruction comprising communicating, to each other peer of the number of other peers over the electronic communications network, a message comprising an update instruction to update its local level of activity counter corresponding to the client and in connection with the service request.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic peer-to-peer level of activity information maintenance and sharing without centralization.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
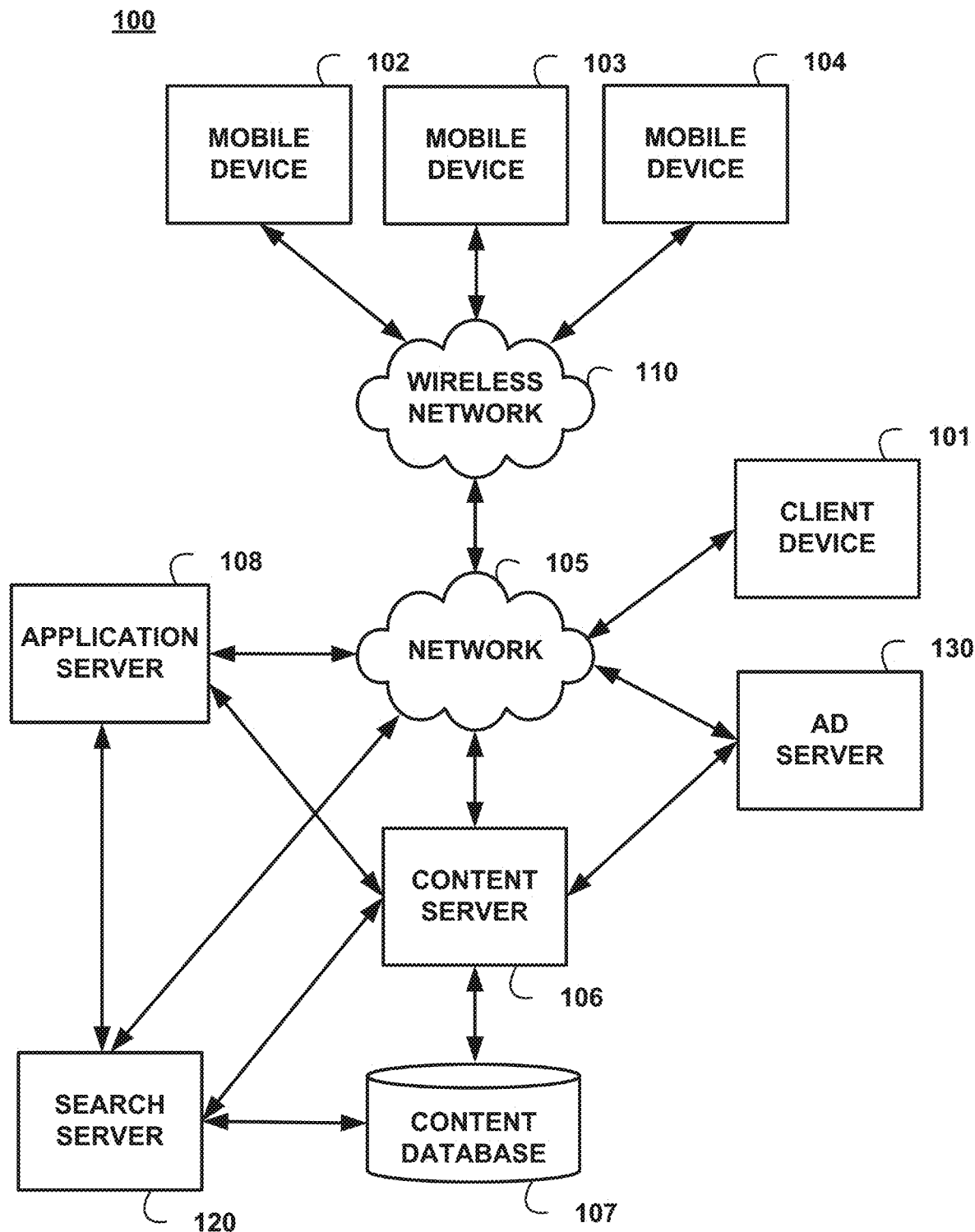
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via electronic mail (or email), for example Yahoo! ® Mail, short message service (SMS), or multimedia message service (MMS), for example Yahoo! Messenger®, an electronic social network, such as and without limitation Tumblr®, Facebook®, LinkedIn®, Twitter®, Flickr®, or Google+®, Instagram™, to provide only a few possible examples. A client device may also include or execute an application to communicate content, such as, for example, textual content, multimedia content, audio content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, level of activity counters can be used to detect whether or not activity is malicious activity, e.g., e.g., spamming, denial of service attacks, hackers, etc. In most cases, a network service, such as and without limitation, a service enabling communication between client devices, such as via an electronic mail (or email) service, short message service, multimedia message service, an electronic social networking service, content (e.g., textual, multimedia content, audio content, or the like) provisioning service, web browsing service, web searching service, web gaming service, electronic commerce service, etc., involves a number of network servers, which might be attacked by an entity, or entities. Typically, an attack is made on a number of servers providing a service, or services, over a network, such as the Internet. A centralized approach has been used to maintain and disseminat level of activity counters; however, such an approach requires that the centralized store of counters be updated by the servers and the centralized store to then update the servers with the updated level of activity counters. This centralized store and synchronization process has inherent problems, including inherent latency, scalability and cost problems. These problems are especially acute when there is a high number of servers, a high number of counters and/or a high volume of counter updates, etc. While partitioning and replication might be used to provide a degree of scalability to a centralized approach, they do not adequately address the latency, scalability and costs issues associated with the centralized approach, as a centralized store and synchronization process is still being used in each partition and replication. In addition, partitioning and replication both add a level of complexity that is costly and can easily result in the erroneous level of activity counter information being provided by the centralized approach.

There is currently an immediate demand for a solution that provides another approach for maintaining and sharing level of activity counters. The instant disclosure provides a novel solution addressing the immediate demand for an automated system, application and/or platform that provides automatic peer-to-peer level of activity information maintenance and sharing without centralization. The present disclosure provides novel systems and methods for automatic peer-to-peer level of activity information maintenance and sharing without centralization.

According to some embodiments, the disclosed systems and methods first receives, from a client computing device and at server, a request requiring an update to a local level of activity counter. As some non-limiting examples, the server can be configured to provide a service to a number of clients. A number of local level of activity counters can be updated, such that each counter's count (or count value) is updated (e.g., increment, decrement, apply a decay (or gain), set (or reset) to a certain value, etc.). The local level of activity counter(s) can be updated in response to a request (or call) by a client, and the updated local level of activity counter(s) correspond to the client making the request (or call). The client can be identified by an identifier (or combination of identifiers), such as and without limitation a user ID, network (e.g., Internet Protocol, or IP) address, cookie identifier, or the like. A message is communicated, by the server, to a number of other servers (or peers) with which the server shares level of activity information, each one of the number of the peers is capable of maintaining its own local level of activity counter(s) corresponding to the client locally. The message comprises a command instructing each one of the number of peers to which the message is directed to update (e.g., increment, decrement, apply a decay (or gain), set to a certain value, etc.) its local level of activity counter(s) corresponding to the client (e.g., as specified by the client key) identified in the message.

The disclosed systems and methods may use the count maintained using the local level of activity counter(s) to determine whether or not to throttle (or limit) operations, or for any other purpose, with respect to any number of clients. The determination may be made using a local level of activity counter's counter value whose update includes applying a decay (or gain). By way of some non-limiting examples, the decay (or gain) may be based on an exponential decay over time or call count, linear decay (gain) over time or call count, explicit reset periodically, sliding window, sigmoid, or the like. A local level of activity counter may have an associated upper limit (or threshold) value, such that if the count value of the local level of activity counter reaches the upper limit it is not incremented further. Rather than incrementing the count value of a local level of activity counter, the count value can be decremented with or without applying a gain function to the count value. Such an inverse functionality can be used for token-based throttling, e.g., decrease token count per client. An instruction recipient (e.g., a peer) can further decay and/or boost the received count based on its state.

The disclosed systems and methods may send the message, with an instruction to update the local level of activity counter(s), to all of the peers sharing level of activity information with the server. Alternatively, the message can be sent to a subset of the peers. In the latter case, the message can include an instruction to increment the counter by an amount dependent on the number of peers included in the subset and the total number of peers sharing level of activity information. By way of a non-limiting example, in a case that there are 1000 peers (including the server communicating the message to its peers) sharing level of activity information and the message is to be sent to ten percent (or 100 peers) of the 1000 peers, the message can be communicated to the 100 peers with an instruction to each peer to increment its own local level of activity counter(s) by 10. By way of some non-limiting examples, the peers included in the peer subset may be selected randomly (e.g., any random, random unique set, random continuous range, etc.), round robin, or the like. Peers sharing level of activity information may be pre-defined, automatically discovered (e.g., gossiping), or the like. Communication between peers can be multicasting, broadcasting, or the like.

Examples of benefits derived from the disclosed systems and methods include: 1) the disclosed systems and methods provide a technologically based mechanism for automatic peer-to-peer, distributed (and without using centralization) maintenance and sharing of level of activity information across a number of servers; and (2) the disclosed systems and methods are based on techniques that are specifically designed to provide a mechanism for a peer to disseminate level of activity information in the form of an instruction(s) to a number of its peers, and to modify its own level of activity counters in response to a received instruction from any if its peer, which has never been explored before.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s) capable of provisioning (e.g., distributing, disseminating, etc.) content. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
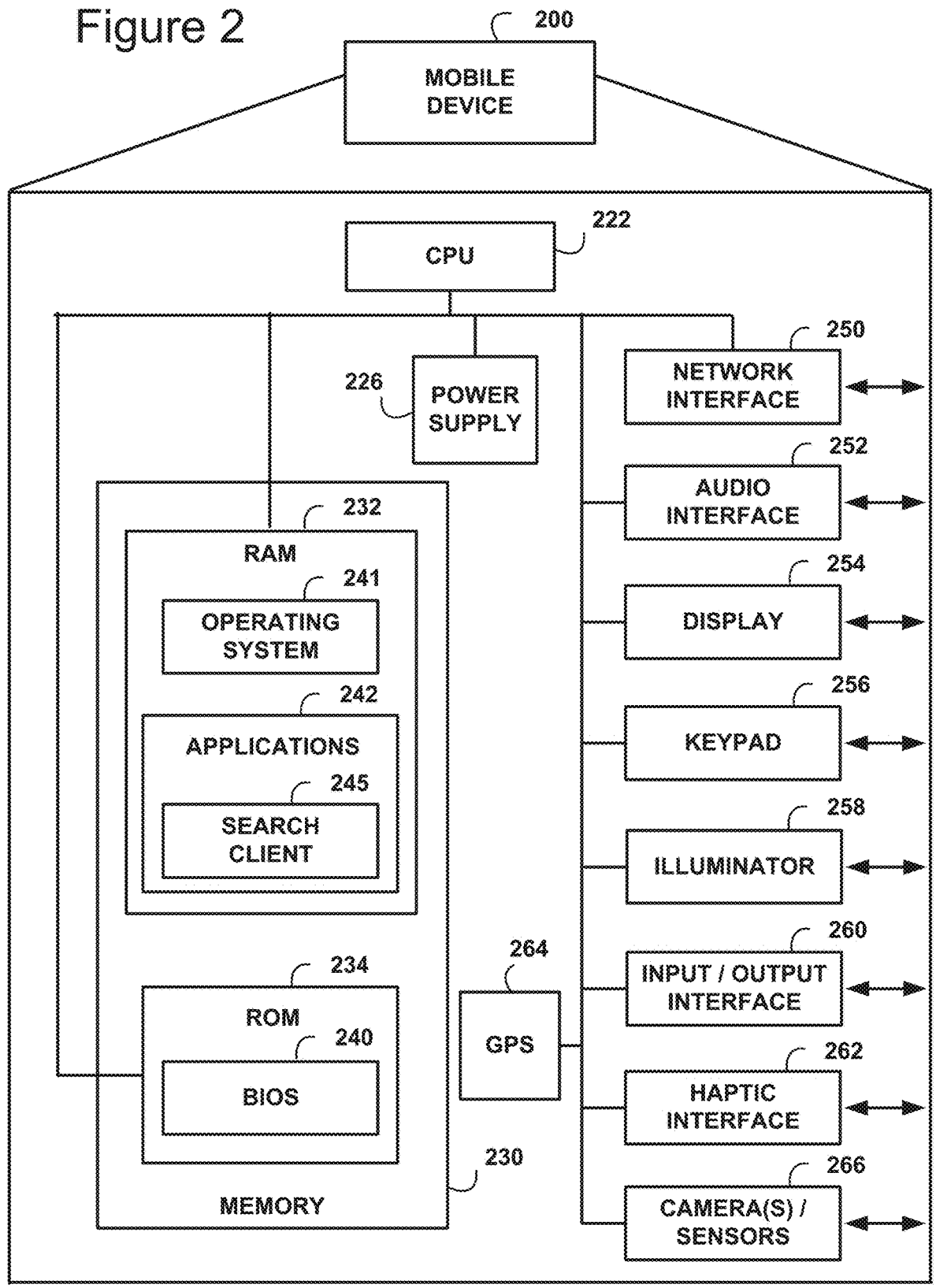
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
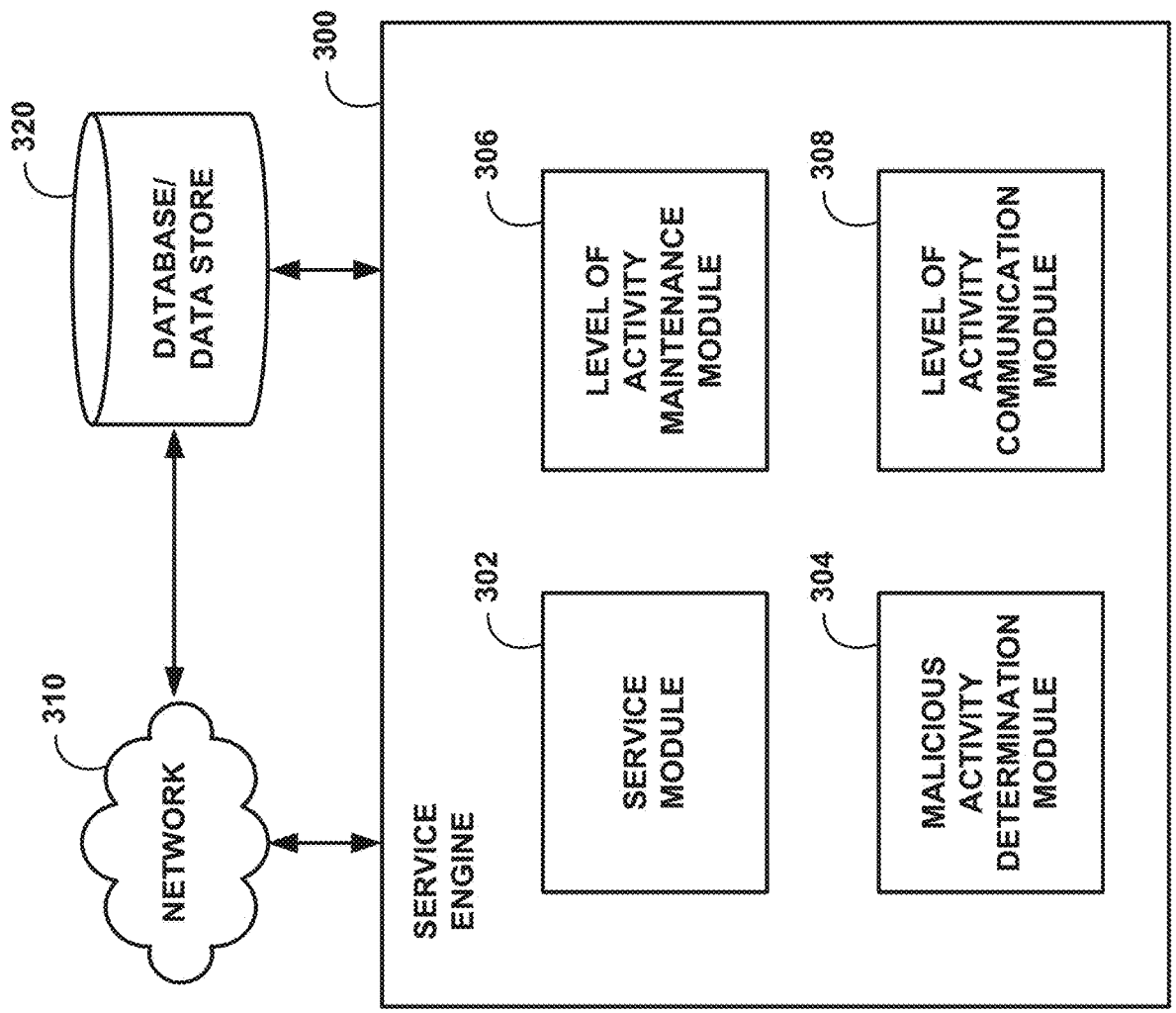
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a service engine 300, network 310 and database 320. The service engine 300 can be a special purpose machine or processor and could be hosted by an application server, content server, social networking server, web server, search server, content provider, email service provider, ad server, user's computing device, and the like, or any combination thereof.

The database 320 can be any type of database, data store or memory, and can be associated with a server on a network (such as and without limitation a content server, search server, application server, etc.). In some embodiments, database 320 can be a component that is internal or external to a server. Database 320 can comprise a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of searching, creating, recommending, rendering and/or delivering content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store local level of activity information (in connection with service engine 300) including but not limited to level of activity counters corresponding to clients (e.g., entities making a request to service engine 300, such as and without limitation a request for a service(s) provided by service module 302 of service engine 300) and level of activity sharing information (e.g., information corresponding to each peer (e.g., other service engines, servers, etc.) sharing level of activity information). Such storage can be realized through any known or to be known type of storage, including but not limited to, a hash table, cache, or any other type of known or to be known dynamic memory allocation technique or technology.

Any number of level of activity counters can be used for each client of any number of clients; and the systems and methods disclosed herein can be used to count any type of activity, such as and without limitation requests (or calls) per network address (e.g., IP address), user, ad impressions, device, etc. Level of activity counters used to count ad impressions can be used in online advertisement campaigns.

The network 310 can be any type of network such as, but not limited to, a wireless network, a local area network (LAN), wide area network (WAN), the Internet, or a combination thereof. The network 310 facilitates connectivity of the service engine 300, and the database of stored resources 320. Indeed, as illustrated in FIG. 3, the service engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as service engine 300, and includes service module 302, malicious activity determination module 304, level of activity maintenance module 306, and level of activity communication module 308, any of which can be implemented using software (e.g., a library of functions), hardware or some combination. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the service engine 300 can be supplied to the database 320 in order to ensure that the information housed in the database 320 is up-to-date as the disclosed systems and methods leverage real-time information, as discussed in more detail below.

Figure 4:
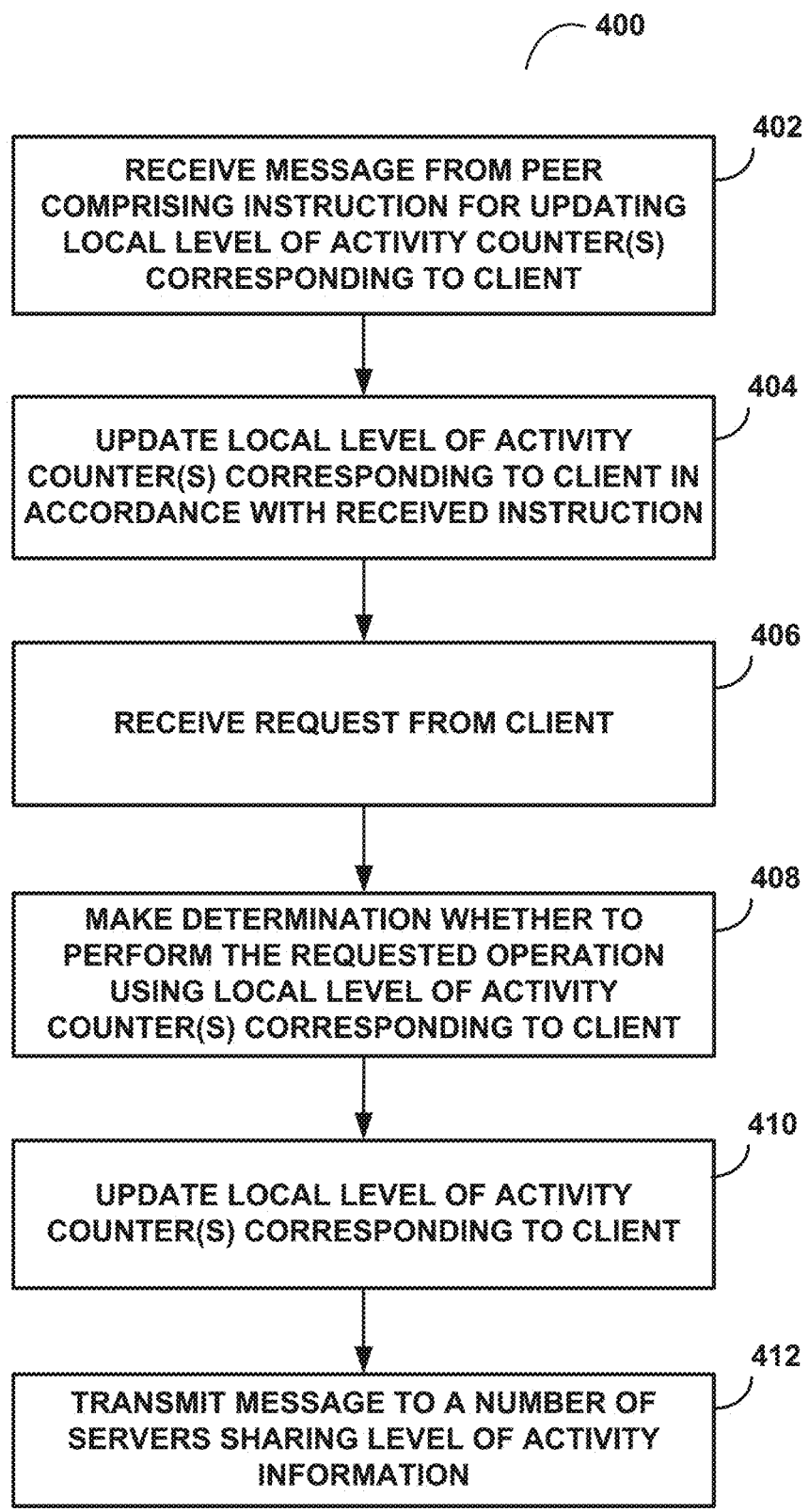
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatic peer-to-peer level of activity information maintenance and sharing without centralization. According to some embodiments, as discussed herein with relation to FIG. 4, the process involves automatically maintaining level of activity counters locally and sharing level of activity information with peers in a message (or messages) directed to a number of peers and comprising an instruction (or instructions) instructing each peer to update its own local (e.g., locally-maintained) level of activity counter(s) in accordance with the instruction(s). As is described in more detail below, such peer-to-peer level of activity maintenance and sharing can involve receiving a level of activity message (or messages) from a peer (e.g., a peer service engine 300), and responding to the received level of activity message(s), each message comprising an instruction (or instructions) for updating a number of locally-maintained level of activity counters (e.g., a number of level of activity counters corresponding to a number of clients). A peer's locally-maintained level of activity counter(s) reflecting peer-to-peer-shared level of activity information corresponding to a client can be used, by the peer, to make a determination whether or not to deny a request received from the client. A peer receiving a request from a client can update its own level of activity counter(s) corresponding to the client and transmit a message (or messages) to a number of peers with an instruction (or instructions) for each peer to update its own local level of activity counter(s) in accordance with the instruction(s).

At step 402, a message is received by service engine 300. The message is from a peer service engine 300 and comprises an instruction for updating a number of local level of activity counters corresponding to a client (e.g., a client identified in the message). In one example, the message may comprise an instruction to increment (or decrement, apply a decay, apply a gain, reset, etc.) a level of activity counter. At step 404, which is performed by level of activity maintenance module 302, a number of local level of activity counters corresponding to a client are updated in accordance with the received instruction.

In contrast to communicating a count (or count value) of the level of activity counter, a peer (in accordance with embodiments of the present disclosure) instead communicates an instruction to another peer (or number of peers), so that each other peer can update the count (or count value) of its own local level of activity counter. This avoids synchronization issues associated with count value synchronization, such as is used in a centralized (or other) approach. By way of one illustrative example, in a case that two different values are received from two different sources using a value synchronization approach, the recipient is unsure which value to use. In contrast, in a case that two different instructions are received (in accordance with embodiments of the present disclosure) from two different sources (e.g., two different service engines 302) to update a level of activity counter, the recipient service engine 302 can perform each instruction to update its local level of activity counter and synchronize its local level of activity counter with that of the different sources. In addition and using peer-to-peer sharing of level of activity information (including update instruction(s)), a latency is reduced (e.g., in comparison to a centralized approach). A peer sends a message (with an update instruction) to each other peer sharing level of activity information so that each other peer is able to efficiently (and without delay) update its own level of activity information. The inaccuracy and delay caused by the added layer of synchronization (and communication) needed with a centralized approach is avoided. That is, using a centralized approach, a centralized store is relied upon to synchronize a level of activity counter count value across a number of servers using an approach in which one server first notifies the centralized store with an updated level of activity counter count value, the centralized store updates the count value for its own level of activity counter, and the centralized store then must communicate the updated level of activity counter count value to other servers, and when the centralized store goes down, synchronization fails. Another advantage of using peer-to-peer sharing of level of activity information described herein is that it is easily scalable, e.g., another peer can be added or removed with little, if any, associated overhead. By way of some examples, a peer can be added or removed by updating each remaining peer's peers table. In addition and as is described in more detail, scalability may be achieved in other ways, such as and without limitation communicating an update instruction to a subset of the total number of peers.

At step 406, a request is received by the service engine 300 (e.g., by service module 302 of service engine 300) from the client, e.g., a mobile device (e.g., mobile device 102, 103 or 104), a client device (e.g., client device 101), or the like. At step 408, which is performed by malicious activity determination module 304, makes a determination whether or not to perform the requested operation using a number of local level of activity counters associated with the requesting client.

In one exemplary illustration, each level of activity counter's counter value corresponding to each client may be stored (or maintained) (e.g., by the level of activity maintenance module 306 of the service engine 300) in a table (e.g., a hash table) or cache (e.g., useful in limiting memory use for a large number of level of activity counters). A cache eviction algorithm, such as and without limitation a least recently used (LRU) algorithm, can be used (e.g., by level of activity maintenance module 306 of service engine 300) to evict (or flush) a counter(s) from the cache.

In a store (e.g., a cache), each local level of activity counter is associated (e.g., by level of activity maintenance module 306 of service engine 300) with a client identifier, which can be specified at any level, e.g., source country (or country), network address (e.g., IP address), user ID, device identification information, advertisement, etc., and temporal information, such as and without limitation a timestamp (e.g., a last update timestamp). The temporal information (e.g., a last update timestamp) can be used to calculate a decay over time. The client identifier can be a key comprising multiple fields, e.g., country and user ID. One or both fields of the key can be used to create additional bias. In one exemplary illustration, if a request comes from a suspicious country, the level of activity counter associated with the request may be increased faster or an application level limit for the count may differ, or both.

At step 408, a client identifier associated with the request received at step 406 can be used as a key to retrieve a number of level of activity counters corresponding to the client (e.g., associated with the client identifier associated with the received request). A retrieved level of activity counter's count value can be compared with an activity level limit (or threshold) to determine whether or not to permit (or prohibit or throttle, in a case that the determination is made to not permit) the requested operation to be performed. In one illustrative example, the requested operation might be prohibited (or throttled) in a case that a count value associated with a local level of activity counter exceeds a respective activity level limit (or threshold). In a case that the determination is made to permit the request, the request can be processed by service module 302 of service engine 300. Service module 302 can perform any type of service, including, but not limited to, a search, electronic messaging, content provisioning, electronic social networking, browsing, ecommerce, cloud-based, storage, web-hosting, recommendation, etc. service.

A bias may be applied in making the determination, e.g., the count value associated with a level of activity counter may be increased (or decreased) faster (or slower) (e.g., using a decay or gain), and/or the respective activity level limit (or threshold) can be decreased (or increased) for a given client, application or a combination of client and application. As yet another illustrative example, an activity level limit (or threshold) (for a number of level of activity counters) may be associated with a given application. In such a case, a determination made at step 408 can be dependent on the application that is to perform the received request.

At step 410, which is performed by level of activity maintenance module 306, a number of level of activity counters corresponding to the client is/are updated. In one illustrative example, the cache storing a local level of activity counter corresponding to the client can be updated (e.g., incremented, decremented, decayed, boosted, etc., as is discussed in more detail below).

In the example of FIG. 4, step 408 can be performed before step 410. Alternatively, step 410 can be performed before step 408.

At step 412, which is performed by the level of activity communication module 308, a message is communicated, e.g., transmitted via an electronic communication network, such as network 310) to a number of peers (e.g., a number of servers, each of which comprises a service engine 300). In some embodiments, the service engine 300 is able to share level of activity information with a plurality of peers (e.g., other servers, each of which comprises a service engine 300). For purposes of illustration, peers can be predetermined (e.g., provisioned with a configuration) and/or discovered automatically (e.g., gossiping).

Database 320 can be used to store information about each peer of the plurality of peers. In accordance with one or more embodiments, database 320 can comprise a peers table, which includes a network address (for each peer) for use (by the level of activity communication module 308) in communicating a message (or notification) comprising an update instruction to one or more peers. The peers table can include a unique identifier for each peer. The peers table can include an entry corresponding to the peer communicating the message, but need not. In any case, a count of the number of entries (e.g., rows) can be used in determining a total number of peers (including the peer communicating the message) involved in sharing level of activity information. As is discussed in more detail below, the number of peers to which the level of activity communication module 308 communicates, at step 412, can be all or some subset of the plurality of peers of the service engine 300.

While TCP (Transport Control Protocol) can be used in communicating the level of activity messages between peers, other network optimization technologies, such as UDP (User Datagram Protocol) may be used to optimize the network layer. Some level of counter command data loss can be tolerated, and UDP is a more efficient data protocol than TCP/IP (Transport Control Protocol/Internet Protocol) point-to-point. As such and in accordance with at least one embodiment, UDP/IP (User Datagram Protocol/Internet Protocol) network packets is used for point-to-point communication without retransmission. This reduces overhead. Another option for some cluster and network configurations is to broadcast (multicast) the counter commands to the number of peers, which further reduces overhead.

Figure 5:
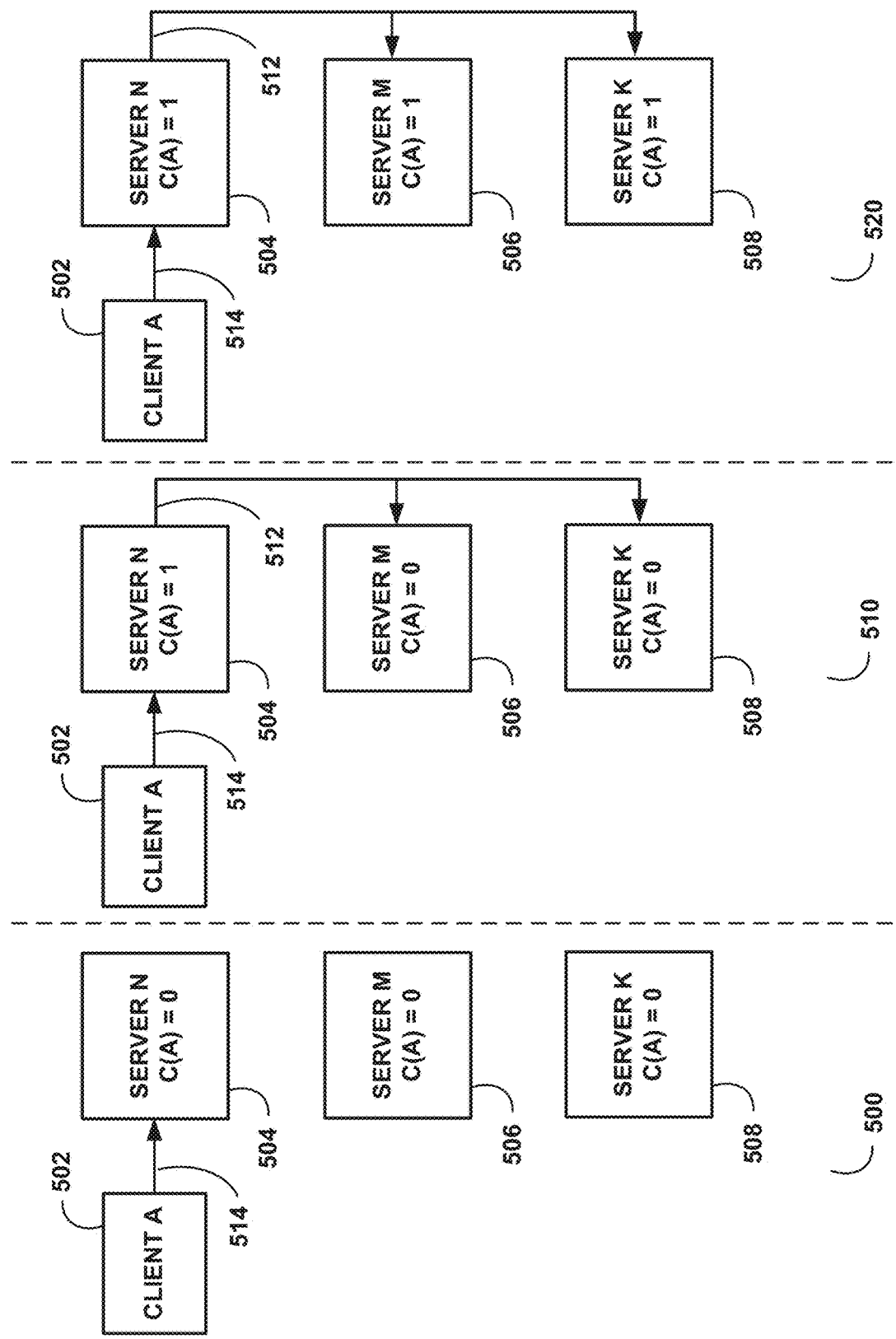
FIG. 5 is a diagram of an exemplary example of a non-limiting embodiment in accordance with some embodiments of the present disclosure.

FIG. 5 provides an illustrative example in which a peer receives an instruction from another peer in connection with a client request received by the other peer. In the example of FIG. 5, servers 504-508 are peers sharing level of activity information, and each one implements server engine 300. In addition, in the example of FIG. 5, three stages (or states) 500, 510 and 520 are illustrated. At stage 500, servers 504-508 each have a level of activity counter, C(A), set (e.g., initialized, updated, etc.) to 0 and corresponding to client 502 (or Client A).

Client 502 makes a request 514 to server 504, at stage 500. At stage 510, server 504 updates its local level of activity counter (C(A)) corresponding to client 502 by incrementing the counter value by 1, and communicates an instruction 512 (e.g., via a message transmitted over an electronic communications network, such as network 310 using a network protocol, such as UDP/IP) to servers 506 and 508. At stage 520, servers 506 and 508 (in response to receiving the message) each update its own local level of activity counter (C(A)) corresponding to client 502 by 1, in correspondence with the count value of server 504's local level of activity counter corresponding to client 502. While this and other examples use an update value of 1, it should be apparent that any value can be used.

Figure 6:
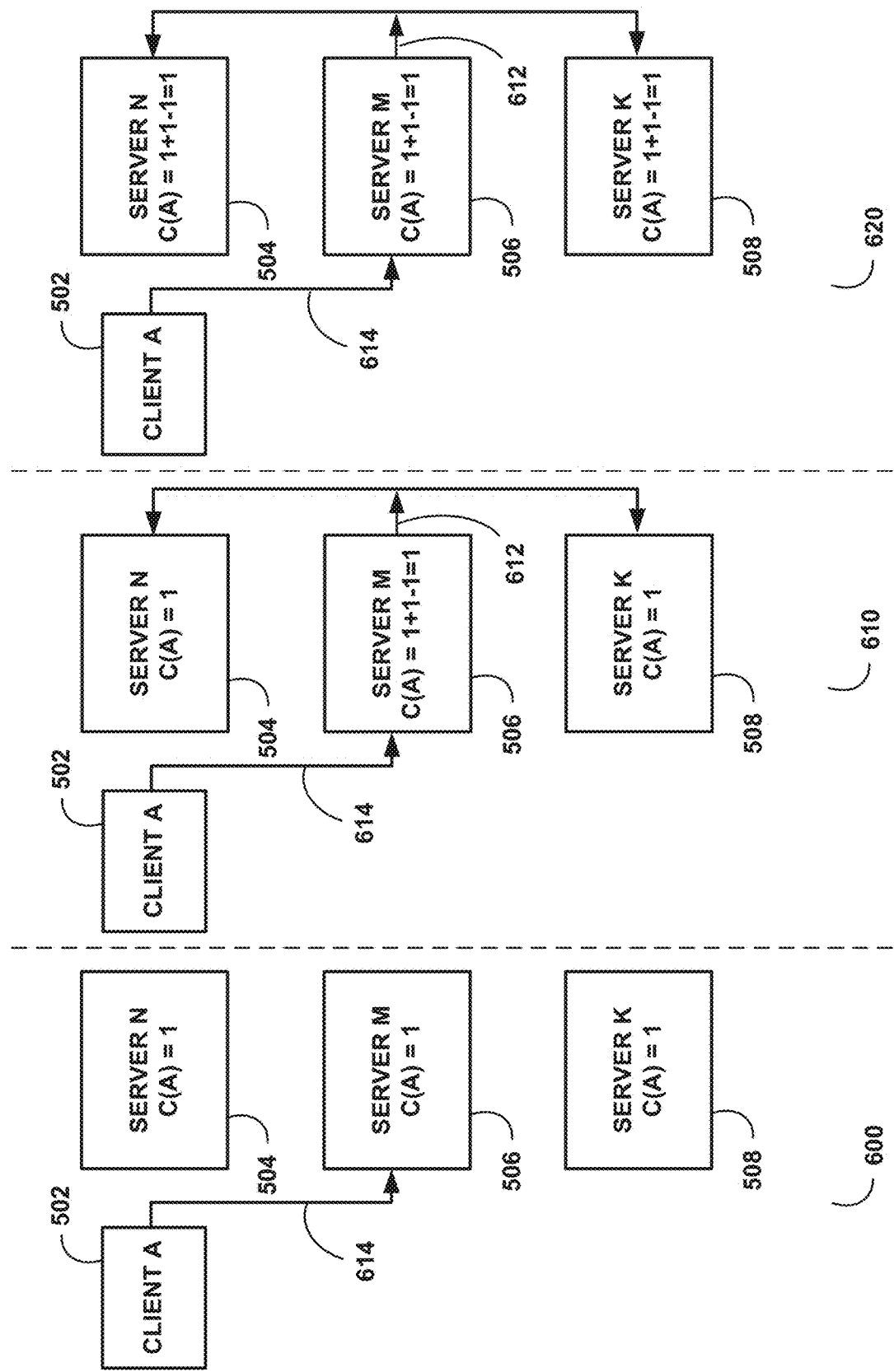
FIG. 6 is a diagram of an exemplary example of a non-limiting embodiment in accordance with some embodiments of the present disclosure.

FIG. 6 provides an illustrative example in which a peer receives a request from a client, and in response increments and decays its own local level of activity counter and notifies its peers (e.g., by communicating an update instruction). In the example of FIG. 6, servers 504-508 are peers sharing level of activity information, and each one implements server engine 300. In addition, in the example of FIG. 6, three stages (or states) 600, 610 and 620 are illustrated. At stage 600, servers 504-508 each have a level of activity counter, C(A), set to 1 (e.g., set at stage 520 of FIG. 5) and corresponding to client 502 (or Client A).

Client 502 makes a request 614 to server 506, at stage 600. At stage 610, server 506 updates its local level of activity counter (C(A)) corresponding to client 502, and communicates an instruction 612 (e.g., via a message transmitted over an electronic communications network, such as network 310 using a network protocol, such as UDP/IP) to servers 506 and 508. In the example of FIG. 6, server 506 increments the count value by one and then decays the count by 1 to yield a value of 1. The update instruction 612 communicated by server 506, at stage 610, notifies servers 504 and 508 to each increment and decay its own local level of activity counter corresponding to client 502. At stage 520, servers 504 and 508 each update its own local level of activity counter (C(A)) corresponding to client 502 by incrementing the count value by 1 and applying the decay, placing their local level of activity counters' count values in correspondence with the count value of server 506's local level of activity counter corresponding to client 502.

It should be apparent that any decay (or gain or boost) mechanism (or function) can be used (e.g., at steps 404 and 410 of FIG. 4). By way of some non-limiting illustrative examples, a decay (or gain/boost) can be based on an exponential decay (or gain/boost) over time or count value, a linear decay (or gain/boost) over time or count value, an explicit periodic reset, a sliding window, a sigmoid, or an arbitrary function. In addition, the rate at which a counter is updated can be limited to enforce immediate throttling (e.g., prohibition of a client's requests).

In one embodiment, at step 404 and step 410, update of a local level of activity counter's count value involves retrieving the local level of activity counter's count value and last update timestamp from database 320 (e.g., from a cache store) using the client's key (e.g., unique client-identification information), and a current time (e.g., in milliseconds). In one illustrative example, the count value can be decayed (or boosted) using a decay (or gain) function. The decay (or gain) can be a decay (or gain) by time passed (e.g., current time minus the last update timestamp value) since last decay (or gain). Then the decayed (or boosted) counter value can be incremented (or decremented) (e.g., by 1, or another value). Optionally, a determination can be made whether the result (e.g., after the increment (or decrement) operation) exceeds a maximum value and if so the result can be set to the maximum value. The final result can then be stored (e.g., in cache) along with an updated last update timestamp (e.g., the current time).

In another illustrative example, the decay (or gain) can be an exponential decay (or gain), which can decrease (or increase) the count value at a rate proportional to the current value. The rate of decay (or gain) can be determined using a mean lifetime, a half-life, etc. By way of a non-limiting example, an exponential decay (or gain) constant can be determined for a given time unit (e.g., 1 second), and the determined exponential decay (gain) constant can be multiplied by a time differential (e.g., a time difference between the current time and the last update time) to determine the decay (or gain) value (or amount) used in decaying (or boosting) the count value. By way of a further non-limiting example, assuming the decay (or gain) constant is equal to 10, the time unit is 1 second, and the time differential is 20 seconds, the decay (or gain) value is 10*20 or 200.

In one or more embodiments, an override can be used with any decay (or gain) mechanism, which can result in a decay (or gain) not being performed. In one example, the override can be such that the decay (or gain) is used if a certain amount (e.g., a threshold amount) of time has passed since the client's last request (or call). If the threshold amount of time has passed, the count value is decreased (or increased) by the decay (or gain) value (e.g., the value determined using an exponential decay (or gain)).

In another illustrative example, the decay (or gain) can be a linear decay (or gain), such that the count value is decayed (or boosted) using a predetermined constant decay (or gain) value (or amount) per time unit. The predetermined constant decay (or gain) value can be multiplied by a time differential (e.g., a time difference between the current time and the last update time) to determine the decay (or gain) value (or amount) used in decaying (or boosting) the count value. By way of a further non-limiting example, assuming the linear decay (or gain) constant is equal to 10, the time unit is 1 second, and the time differential is 20 seconds, the decay (or gain) value is 10*20 or 200.

Figure 7:
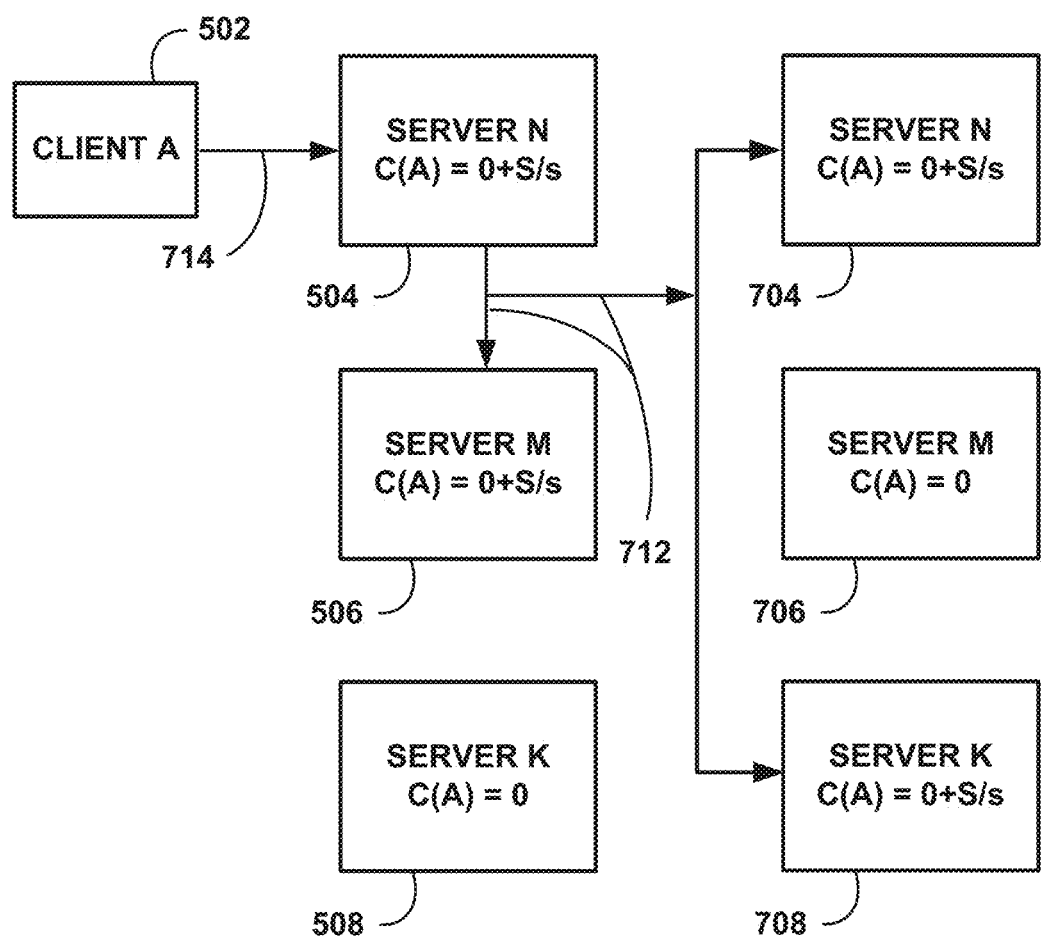
FIG. 7 is a diagram of an exemplary example of a non-limiting embodiment in accordance with some embodiments of the present disclosure.

FIG. 7 provides an illustrative example in which a peer receives a request from a client, and (in response) updates its own local counter and notifies a subset of its peers (e.g., by communicating an update instruction to the peer subset). In the example of FIG. 7, servers 504-508 and 704-708 are peers sharing level of activity information, and each one implements server engine 300. Client 502 makes a request 714 to server 506. Server 506 updates its local level of activity counter (C(A)) corresponding to client 502, and communicates an instruction 712 (e.g., via a message transmitted over an electronic communications network, such as network 310 using a network protocol, such as UDP/IP) to servers 506, 704 and 708.

In the example of FIG. 7, server 506 increments the count value by a value determined using the total number of servers (6 in the example) and the number of servers (3 in the example) to which the notification (or message) is communicated. In the example, the increment value is 2, or 6/3. The update instruction 712 communicated by server 506 notifies servers 506, 704 and 708 to each increment its own local level of activity counter corresponding to client 502 by the same amount (by 2). As shown in the example, servers 506, 704 and 715 each update its own local level of activity counter (C(A)) corresponding to client 502; however, servers 508 and 706 (which did not receive update instruction 712) do not update their local level of activity counters corresponding to client 502, since neither server received the instruction 712 from server 504. In one illustrative example, the servers 506, 704 and 715 can be selected randomly (e.g., any random, random unique set, random continuous range, etc.), round robin, or the like.

In the example shown in FIG. 7, "S" (which represents a total number of peers involved in sharing level of activity information) can be determined by a count of the number of entries (e.g., rows) in the peers table, and "s" represents a maximum number of packets per update (e.g., per client request), which can be a preconfigured value, a dynamically-determined value (e.g., based on network usage, network bandwidth, etc.), etc. Advantageously, this approach can increase scale (e.g., add a number of peers) while minimizing any network overhead that might otherwise occur with an increased scale. In accordance with at least one embodiment, a number (equal to the maximum number of packets per update) of peers can be selected (e.g., randomly selected) from the peers table, and a message (e.g., message 714) can be sent to the selected peers, so that each selected peer can update its own local level of activity counter (e.g., the local level of activity counter associated with client 502) by an amount determined by dividing the total number of peers by the maximum number of packets per update (e.g., S/s, as shown in the example of FIG. 7).

By way of further illustration, sending a message comprising an update instruction to a subset of all of the peers achieves an amount of scalability with minimal impact and yields the same counter increment across all of the servers over time (by using a higher increment value than what otherwise be used in a case that all peers are notified to perform a level of activity counter update). By way of one illustrative example, assume that there are 100 servers and that a throttling threshold value of 1000 requests (or calls) is used. In a case that each of the 100 servers update its own local level of activity counter corresponding to a client by 1 in response to each request made by the client, the client might make 10,000 requests across the 100 servers (in a case that the client makes 100 requests of each server and each server invokes a throttling mechanism when its local level of activity counter's count values meets the throttling threshold). Assume, for the sake of example, rather than the 100 servers updating a local level of activity counter corresponding to the client in response to each client request, a subset (e.g., 10) of the servers perform the update (e.g., by each incrementing its own local level of activity counter corresponding to a client by a value of 10). In response to the client making a request to a first server, each of 10 servers (including the first server) updates its own local level of activity counter corresponding to the client using the counter increment amount of 10. If the client makes a request of another (second) server, each of 10 servers (including the second server) updates its own local level of activity counter corresponding to the client using the counter increment amount of 10. Even in a case that the client continues in this fashion (e.g., making a request of a different server each time until it makes a request to each server of the 100 servers), the client is limited to a total of 10,000 requests, at which time all 100 servers will have a value of 1000, which is the throttling threshold value.

Figure 8:
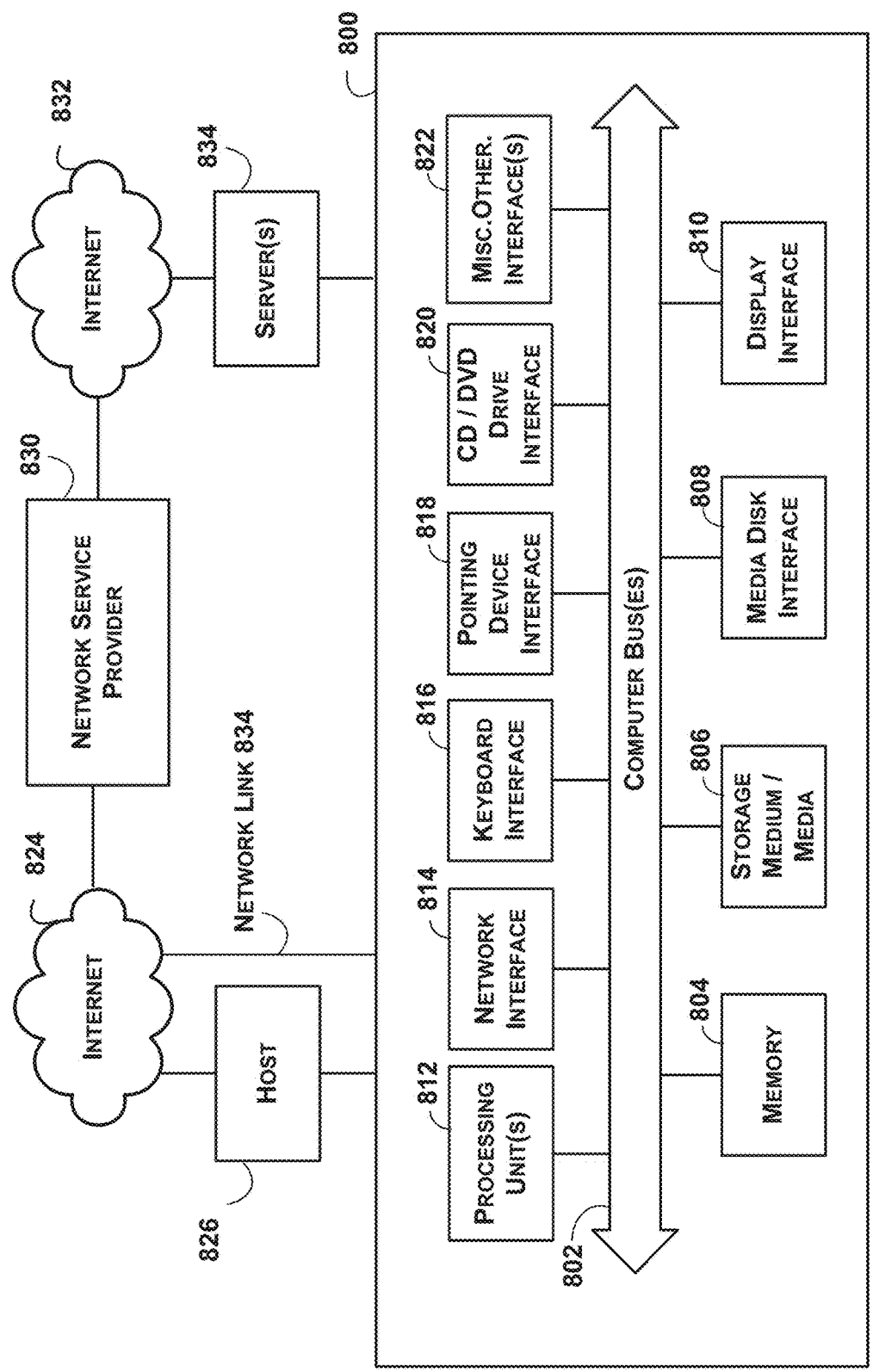
FIG. 8 is a block diagram illustrating the architecture of an exemplary hardware device in accordance with one or more embodiments of the present disclosure.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:

receiving, at a server computing device of a peer and from a computing device of a client over an electronic communications network, a message comprising an instruction to increment or decrement a level activity of counters;

updating, via the server computing device and by the peer, a number of the local level of activity counter that corresponds to the client;

receiving, by the server computing device, a request from the client for a service;

determining, by the server computing device, based on the updated number of the local level of activity counter, whether the request corresponds to suspicious network activity, the determination comprising determining whether the updated number of the local level of activity counter satisfies a threshold;

determining, via the server computing device, a number of other peers of the peer from a plurality of peers sharing level of activity information, the plurality of peers comprising the peer and the number of other peers excluding the peer;

performing a second update, by the server computing device, of the number of the local level of activity counter when the threshold determination does not satisfy the threshold; and communicating, by the peer via the server computing device of the peer and responsive to the request of the client for service, a message to each other peer of the number of other peers, without sending the peer's local level activity counter value, the communicated message instructing each other peer to update its local level of activity counter corresponding to the client to reflect the service request received by the peer.

2. The method of claim 1, further comprising:

making, via the server computing device and by the peer, a determination whether or not to perform the service requested by the client, the determination comprising using a number of the peer's local level of activity counters, including the level of activity counter, corresponding to the client and a throttling threshold.

3. The method of claim 1, further comprising:

receiving, at the server computing device of the peer and over the electronic communications network from another peer of the plurality of peers, a message comprising an update instruction to update its local level of activity counter corresponding to the client; and updating, via the server computing device, the local level of activity counter in accordance with the received update instruction.

4. The method of claim 3, the message instructing each other peer to update its local level of activity counter comprising an instruction to update its local level of activity counter using one of a gain and a decay function.

5. The method of claim 1, wherein each other peer of the plurality of peers has associated information stored in a peers table, the peers table comprising a network address of each other peer of the plurality of peers.

6. The method of claim 1, updating the local level of activity counter further comprising storing a last update timestamp in a store comprising an entry for each local level of activity counter, including the updated local level of activity counter, maintained by the peer, each entry comprising client identification information comprising a client key, and the received service request having an associated client key.

7. The method of claim 6, updating the local level of activity counter further comprising:

retrieving, via the server computing device, the local level of activity counter's count value from the store using the client's associated client key;

updating, via the server computing device, the retrieved count value of the local activity counter; and storing, via the server computing device and in the store's entry corresponding to the local level of activity counter, the updated count value of the local activity counter and an updated last update timestamp.

8. The method of claim 6, the last update timestamp and a current time associated with the request being used in one of an exponential gain function, an exponential decay function, a linear gain function and a linear decay function to update the local level of activity counter's count value.

9. The method of claim 8, the number of other peers are selected randomly.

10. The method of the claim 1, the determining the number of other peers further comprising:

determining, via the server computing device, a maximum number of packets;

determining, via the server computing device, a peer count of the plurality of peers, including the peer, sharing level of activity information;

determining, via the server computing device, an update amount using the determined peer count and the determined maximum number of packets; and selecting, via the server computing device, the number of other peers equal to the maximum number of packets.

11. The method of claim 10, the message communicated to the number of other peers comprising the update amount.

12. The method of claim 1, the message is communicated using UDP (User Datagram Protocol).

13. A non-transitory computer-readable storage medium tangibly encoded with computer-executable instructions that when executed by a processor associated with a server computing device perform a method comprising:

receiving, by a peer and from a computing device of a client over an electronic communications network, a message comprising an instruction to increment or decrement a level activity of counters;

updating a message comprising an instruction to increment or decrement a level activity of counters;

receiving a request from the client for a service;

determining, based on the updated number of the local level of activity counter, whether the request corresponds to suspicious network activity, the determination comprising determining whether the updated number of the local level of activity counter satisfies a threshold;

determining a number of other peers of a plurality of peers sharing level of activity information, the plurality of peers comprising the peer and the number of other peers excluding the peer;

performing a second update of the number of the local level of activity counter when the threshold determination does not satisfy the threshold; and communicating, by the peer responsive to the request of the client for service, a message to each other peer of the number of other peers, without sending the peer's local level activity counter value, the communicated message instructing each other peer to update its local level of activity counter corresponding to the client to reflect the service request received by the peer.

14. The non-transitory computer-readable storage medium of claim 13, further comprising:
making, by the peer, a determination whether or not to perform the service requested by the client, the determination comprising using a number of the peer's local level of activity counters, including the level of activity counter, corresponding to the client and a throttling threshold.

15. The non-transitory computer-readable storage medium of claim 13, further comprising:
receiving, by the peer and over the electronic communications network from another peer of the plurality of peers, a message comprising an update instruction to update its local level of activity counter corresponding to the client; and
updating, by the peer, the local level of activity counter in accordance with the received update instruction.

16. The non-transitory computer-readable storage medium of claim 13, the local level of activity counter update further comprising storing a last update timestamp in a store comprising an entry for each local level of activity counter, including the updated local level of activity counter, maintained by the peer, each entry comprising client identification information comprising a client key, and the received service request having an associated client key.

17. The non-transitory computer-readable storage medium of claim 16, the local level of activity counter update further comprising:
retrieving the local level of activity counter's count value from the store using the client's associated client key;
updating the retrieved count value of the local activity counter; and
storing, in the store's entry corresponding to the local level of activity counter, the updated count value of the local activity counter and an updated last update timestamp.

18. The non-transitory computer-readable storage medium of claim 16, the last update timestamp and a current time associated with the request being used in one of an exponential gain function, an exponential decay function, a linear gain function and a linear decay function to update the local level of activity counter's count value.

19. The non-transitory computer-readable storage medium of claim 13, determination of the number of other peers further comprising:
determining a maximum number of packets;
determining a peer count of the plurality of peers, including the peer, sharing level of activity information;
determining an update amount using the determined peer count and the determined maximum number of packets; and
selecting the number of other peers equal to the maximum number of packets.

20. A computing device comprising:
a processor;
a non-transitory storage medium for tangibly storing thereon program logic for execution by the processor, the program logic comprising:
logic executed by the processor for receiving, by a peer and from a computing device of a client over an electronic communications network, a message comprising an instruction to increment or decrement a level activity of counters;
logic executed by the processor for updating a number of the local level of activity counter that corresponds to the client;
logic executed by the processor for receiving a request from the client for a service;
logic executed by the processor for determining, based on the updated number of the local level of activity counter, whether the request corresponds to suspicious network activity, the determination comprising determining whether the updated number of the local level of activity counter satisfies a threshold;
logic executed by the processor for determined a number of other peers of the peer from a plurality of peers sharing level of activity information, the plurality of peers comprising the peer and the number of other peers excluding the peer;
logic executed by the processor for performing a second update of the number of the local level of activity counter when the threshold determination does not satisfy the threshold; and
logic executed by the processor for communicating, by the peer and responsive to the request of the client for service, a message to each other peer of the number of other peers, without sending the peer's local level activity counter value, the communicated message instructing each other peer to update its local level of activity counter corresponding to the client to reflect the service request received by the peer.

* * * * *